United States Patent Office 2,960,283
Patented Nov. 15, 1960

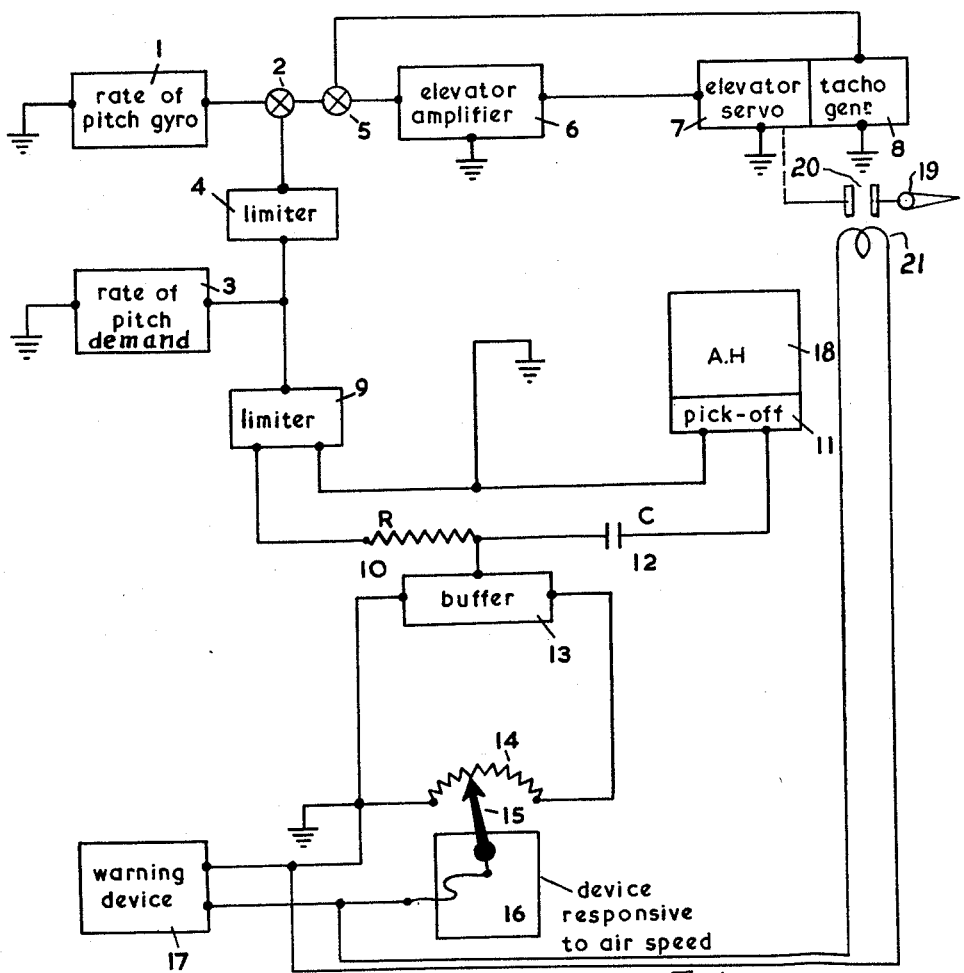

2,960,283

SAFETY DEVICES FOR AUTOMATIC PILOTS

Frederick William Meredith, Harpenden, Herts, and David William Righton, Cheltenham, Gloucestershire, England, assignors to Smiths America Corporation, Ruxton, Md.

Filed Aug. 22, 1955, Ser. No. 529,604

3 Claims. (Cl. 244—77)

The present invention relates to safety devices for automatic pilots for aircraft.

It is desirable to provide means to provide an indication or exercise a control (e.g. by disconnecting the automatic pilot) when the operation of the automatic pilot is such as to lead to an unsafe loading upon the lifting surfaces of the aircraft. The loading upon these surfaces is dependent upon the angle of attack (usually denoted by the symbol $\alpha$) between the surface of the air flow past it and also upon the quantity usually denoted by the symbol "Q" equal to $\frac{1}{2} \rho v^2$ where $\rho$ is the air density and $v$ the velocity of the air stream relative to the surface. The quantity $\alpha$ is approximately related to the attitude of the craft (designated by the angle $\theta$ by a relation of the form $$\alpha = \frac{t_1 D}{t_1 D + 1} \cdot \theta$$

where D denotes the operator of differentiation with respect to time, and $t_1$ is a parameter having the dimensions of time—the "attitude-attack" parameter, that is to say, alpha and theta are connected by the differentiation equation $t_1 D\alpha + \alpha = t_1 D\theta$. $t_1$ varies with the airspeed of the craft.

According to the present invention we provide, in conjunction with an automatic pilot adapted to control the attitude of an aircraft in accordance with an attitude-change demand signal, a device comprising attitude responsive means responsive to the actual attitude of the craft, means to derive from the attitude-change demand signal and the output from said attitude-responsive means a further signal proportional to the difference between the actual and demanded rate of change of attitude operated upon by an operator of the form $$\frac{t_2}{t_2 D + 1}$$

where $t_2$ is a parameter having the dimensions of time, and utilisation means operating when the said further signal exceeds a predetermined level.

The term "operator" as used herein indicates a differential operator in differential equations; a polynomial in the operator D, where D denotes the operator of differentiation with respect to time, i.e. when D stands for $d/dt$ and Dy for $dy/dt$. See more general statement on page 106, Mathematics Dictionary, James and James, published by Van Nostrand 1949.

The parameter $t_2$ is most conveniently a constant, and is preferably made approximately equal to the maximum value that parameter $t_1$ can reach.

The predetermined level will be set in accordance with the maximum safe loading of the aircraft lifting surfaces, so that the utilisation means operate before an unsafe condition is reached.

The attiude-responsive means are preferably independent of the automatic pilot. They may conveniently comprise an attitude-responsive gyroscope.

The attitude-change demand signal may conveniently be a rate of change of attitude demand signal.

Preferably the said further signal is multiplied by the current value of Q before application to the utilisation means, which may comprise a warning device such as 17, a disconnect servo for clutch 20, or both.

An embodiment of the invention wherein it is used in conjunction with an automatic pilot for the control of an aircraft in pitch is shown schematically in the accompanying drawing and will now be described.

The automatic pilot consists of a rate gyroscope 1 arranged to give a unidirectional electrical signal output proportional to the rate of pitch of the aircraft which is applied to one input of a subtracting device, indicated as a first differential 2. The output of a low-impedance rate of pitch demand signal generator 3 (a further unidirectional voltage) is applied to the other input of differential 2 through a first limiter 4. Signal generator 3 and limiter 4 may assume any of the numerous forms well known to those skilled in the art. Signal generator 3 may conveniently be, for example, a potentiometer and limiter 4 may comprise suitably biased rectifiers. The output of differential 2 is thus proportional to the difference between the actual and (limited) demanded rate of pitch, and is applied to one input of a further differential 5. The output of differential 5 is applied to an elevator servo amplifier 6 whose output is applied to an elevator servo motor 7. Servo motor 7 positions an elevator 19 through conventional mechanical means including a clutch 20 controlled by an electric winding 21 and also drives a tachometric signal generator 8 whose output is applied to the other input of differential 5. The components so far described operate in a well-known manner to actuate the elevator in a direction and at a rate to make the actual rate of pitch of the aircraft equal to the demanded rate.

The rate of pitch demand signal is also applied to the input of a further limiter 9 generally similar to limiter 4, having a two-terminal low impedance output, one output terminal being earthed. The other output terminal is connected to one terminal of a resistor 10 (having value R ohms). A low-impedance two-terminal pickoff 11 is positioned in accordance with deviation of the aircraft in pitch from a datum attitude by means of a conventional gyroscopic artificial horizon indicated at 18, to give a unidirectional pitch deviation signal. One output terminal of pick-off 11 is earthed and the other connected through a capacitor 12 (of value C farads) to the second terminal of resistor 10. The junction of capacitor 12 and resistor 10 is connected to the input of a high impedance input-low impedance output buffer stage 13, whose output is connected across a variable resistor 14. Buffer stage 13 may assume any of the forms well known to those skilled in the electronic art. It may, very conveniently, comprise a cathode follower. The wiper 15 of resistor 14 is positioned by a device 16 responsive to the airspeed of the craft in accordance with the current value of $Q(=\frac{1}{2}\rho v^2)$ and the voltage between wiper 15 and one end of resistor 14 is applied to a warning device 17. Warning device 17 may be of any well-known convenient kind, either visual or audible, operating when the voltage applied thereto exceeds some predetermined value.

The sense of connection of limiter 9 and pick-off 11 and the relation between pitch deviation and pitch deviation signal (that is to say, the magnitude of signal obtained per unit of pitch deviation) is so chosen that the voltage appearing between the junction of capacitor 12 and resistor 10 and earth is proportional to $$\frac{CRD}{CRD+1}\cdot\theta_a - \frac{CR}{CRD+1}D\theta_d$$

where $\theta$ denotes the actual pitch attitude $D\theta_d$ denotes the demanded rate of pitch attitude deviation (supposing the inputs to the limiters not to be sufficient to bring their limiting properties into action).

C and R are so chosen that their product (CR, designated as "$t_2$") is equal to the maximum value which the attitude-attack parameter can attain for the aircraft.

The expression for the voltage can then be re-written as $$\frac{t_2 D}{t_2 D + 1}(\theta_a - \theta_d)$$

The output between slider 15 and earth is then proportional to $$Q(\alpha_a - \alpha_d)$$

in the most severe conditions when $t_2 = t_1$, except that the effects of turbulence upon the actual angle of attack are eliminated.

Warning device 17 is set to operate when this output corresponds to the approach of unsafe loading on the wings or elevator.

Instead of (or in addition to) operating the warning device 17 the output may be utilised to disconnect the servo motor from the elevator by connecting it to control clutch 20 coupling the servo-motor 7 and elevator 19.

Actuating coil 21 of control clutch 20 may be connected in parallel with warning device 17 as shown.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Automatic control apparatus for aircraft, comprising a rate of change of attitude demand signal generator, means to control a control surface of the craft to change the craft attitude at a rate in accordance with the rate of change attitude demand signal, attitude responsive means giving an attitude signal in accordance with the actual attitude of the craft, means to derive from the rate of change of attitude demand signal and the attitude signal a further signal proportional to the difference between the actual and demanded rates of change of attitude operated upon by a differential operator of the form $$\frac{t_2}{t_2 D + 1}$$

wherein $t_2$ is a parameter having the dimensions of time and D denotes the operator of differentiation with respect to time, and utilization means connected to said means to derive a further signal whereby said further signal is applied to said utilization means for operation thereof when the said further signal exceeds some predetermined level.

2. Automatic pitch control apparatus for aircraft, comprising means to generate a rate of change of pitch demand signal, means to control the aircraft elevators to change the pitch attitude at a rate in accordance with the rate of change of pitch demand signal, said means including a servo motor coupled to the elevators through a clutch controllable by an electric signal, an artificial horizon instrument giving a signal in accordance with the actual pitch attitude of the craft, means to derive from the rate of pitch demand signal and the pitch signal a further signal proportional to the difference between the actual and demanded rates of pitch operated on by an operator of the form $$\frac{t_2}{t_2 D + 1}$$

wherein $t_2$ is a parameter having the dimensions of time and D denotes the operator of differentiation with respect to time said further signal being applied to said clutch to disengage it when said further signal exceeds some predetermined value.

3. Automatic control apparatus for aircraft comprising means to generate a unidirectional electrical rate of change of attitude demand signal between first and second terminals, means to control a control surface of the craft to change craft attitude at a rate in accordance with said rate of change of attitude demand signal, attitude-responsive means adapted to give a unidirectional electric signal between the first terminal and a third terminal in accordance with deviation of the craft from a datum attitude, a resistor and capacitor connected in series between the second and third terminals, one terminal of the resistor being connected to the second terminal and one terminal of the capacitor to the third, said junction of said capacitor and said resistor and said first terminal comprising output terminals across which appears a signal proportional to the difference between the actual and demanded rate of change operated upon by the differential operator $$\frac{t_2}{t_2 D + 1}$$

where $t_2$ is the time-constant of the resistor and capacitor, and utilisation means comprising disengaging means connected across said output terminals and operable to disengage said means to control a surface when said output signal exceeds a predetermined value.

References Cited in the file of this patent

UNITED STATES PATENTS

| | | |
|---|---|---|
| 2,589,834 | MacCallum | Mar. 18, 1952 |
| 2,662,207 | Hollister | Dec. 8, 1953 |
| 2,673,314 | MacCallum | Mar. 23, 1954 |
| 2,733,878 | Ciscel | Feb. 7, 1956 |